US009436225B2

(12) United States Patent
Shin et al.

(10) Patent No.: US 9,436,225 B2
(45) Date of Patent: Sep. 6, 2016

(54) MOBILE TERMINAL

(71) Applicant: LG Electronics Inc., Seoul (KR)

(72) Inventors: Minchul Shin, Seoul (KR); Dongyoup Han, Seoul (KR); Sukho Hong, Seoul (KR); Jongwun Kim, Seoul (KR); Sangjo Ryu, Seoul (KR); Seungmin Seen, Seoul (KR); Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 14/591,794

(22) Filed: Jan. 7, 2015

(65) Prior Publication Data

US 2015/0212549 A1 Jul. 30, 2015

(30) Foreign Application Priority Data

Jan. 24, 2014 (KR) ........................ 10-2014-0009201

(51) Int. Cl.
*G06F 1/16* (2006.01)
*H04M 1/02* (2006.01)
*G02F 1/1333* (2006.01)
*G02F 1/1335* (2006.01)
*G02F 1/1368* (2006.01)

(52) U.S. Cl.
CPC ........... *G06F 1/1652* (2013.01); *G02F 1/1368* (2013.01); *G02F 1/133308* (2013.01); *G02F 1/133605* (2013.01); *G06F 1/1637* (2013.01); *H04M 1/0266* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,462,289 | B2* | 6/2013 | Nishizawa | ........ G02F 1/133308 349/160 |
| 9,291,845 | B2* | 3/2016 | Shin | ..................... H05K 5/0086 |
| 2009/0015747 | A1* | 1/2009 | Nishizawa | ........ G02F 1/133308 349/58 |
| 2010/0142127 | A1* | 6/2010 | Johansson | ............. H04M 1/026 361/679.01 |
| 2013/0222298 | A1* | 8/2013 | Kato | ........................ G06F 3/01 345/173 |
| 2013/0321740 | A1* | 12/2013 | An | ........................ H05K 5/0217 349/58 |
| 2014/0009914 | A1* | 1/2014 | Cho | .......................... G09F 9/35 362/97.3 |
| 2015/0163896 | A1* | 6/2015 | Kim | .................. G02F 1/133308 361/749 |

FOREIGN PATENT DOCUMENTS

| | | |
|---|---|---|
| EP | 2608492 A1 | 6/2013 |
| EP | 2640040 A1 | 9/2013 |

\* cited by examiner

*Primary Examiner* — Lisa Lea Edmonds
(74) *Attorney, Agent, or Firm* — Birch, Stewart, Kolasch & Birch, LLP

(57) ABSTRACT

The present disclosure provides a mobile terminal including a window provided on one surface of a terminal body, and having a rear surface formed in a curved shape, a display mounted to the rear surface of the window and configured to output visual information through the window, and a separation-preventing member having one side coupled to the window and the other side coupled to the display, and configured to prevent the display from being separated from the window in a direction that the window and the display are spaced apart from each other.

20 Claims, 12 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0009201, filed on Jan. 24, 2014, the contents of which is incorporated by reference herein in its entirety.

BACKGROUND OF THE DISCLOSURE

1. Field of the Disclosure

This specification relates to a mobile terminal with a display unit formed in a curved shape.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

Mobile terminals (or electronic devices) may be configured to perform various functions, for example, data and voice communication, capturing images or video, storing voice, reproducing music files via a speaker system, displaying images or video and the like. Some of mobile terminals may include an additional function of playing electronic games, and other mobile terminals may be implemented as multimedia players. In addition, in recent time, mobile terminals can receive multicast signals to allow viewing of visual contents, such as broadcasting, video or television programs.

As it becomes multifunctional, a mobile terminal can be allowed to capture still images or moving images, play music or video files, play games, receive broadcast and the like, so as to be implemented as an integrated multimedia player.

Furthermore, many efforts are undergoing to support or enhance various functions of such mobile terminals. Such many efforts include changes and improvement of structural components implementing a mobile terminal and/or software or hardware improvement.

In view of the improvements of the structural components, mobile terminals are evolving into various design shapes. Accordingly, a mobile terminal with a display unit in a curved shape is attracting attention. In response to such attention to the curved display unit, active researches on a device structure focusing on the curved display unit are undergoing.

SUMMARY OF THE DISCLOSURE

Therefore, an aspect of the detailed description is to provide a structure, capable of preventing (restricting) separation between a window and a display, in a mobile terminal having a curved display unit.

Another aspect of the detailed description is to provide a novel device structure having a curved display unit.

To achieve these and other advantages and in accordance with the purpose of this specification, as embodied and broadly described herein, there is provided a mobile terminal including a window provided on one surface of a terminal body, and having a rear surface formed in a curved shape, a display mounted to the rear surface of the window and configured to output visual information through the window, and a separation-preventing member having one side coupled to the window and the other side coupled to the display, and configured to prevent the display from being separated from the window in a direction that the window and the display are spaced apart from each other.

In accordance with one exemplary embodiment disclosed herein, the separation-preventing member may be subject to a tensile force in the spaced direction by the coupling.

In accordance with another exemplary embodiment disclosed herein, the separation-preventing member may include a coupling portion coupled to the rear surface of the window, a connecting portion extending in a bent manner from the coupling portion, and covering at least one side surface of the display, and a supporting portion extending in a bent manner from the connecting portion and supporting at least part of a rear surface of the display.

The coupling portion may be formed in a curved shape to correspond to a curved shape of the rear surface of the window.

The window may include key holes accommodating mechanical keys, which are manipulated in a pushing manner, and the coupling portion may include through holes formed to correspond to the key holes and fully covering outer circumferences of the mechanical keys.

A printed circuit board may be provided on a rear surface of the separation-preventing member, and the connecting portion may include a hole for insertion of a flexible printed circuit board extending from one side of the display therethrough. Here, the flexible printed circuit board may electrically connect the display and the printed circuit board.

In accordance with another exemplary embodiment disclosed herein, the window may be curved along a first direction, and the separation-preventing member may include a first separation-preventing portion and a second separation-preventing portion provided at both end portions of the window in the first direction, respectively, and extending along a second direction perpendicular to the first direction.

The first separation-preventing portion and the second separation-preventing portion may be connected to each other so as to cover the rear surface of the display.

In accordance with another exemplary embodiment disclosed herein, the display may include a liquid crystal panel on which an image is output, a backlight unit configured to emit light toward the liquid crystal panel, and a reflection member disposed to surround the backlight unit to reflect light leaked from a side surface of the backlight unit. Here, the separation-preventing member may be disposed to cover at least part of the reflection member.

The separation-preventing member may include a first coupling portion coupled to the window, and a second coupling portion extending in a bent manner from the first coupling portion and disposed to surround the display. Here, a portion of the second coupling portion may be integrally coupled with the reflection member by double injection.

A light absorbing layer may be provided on an inner side surface of the second coupling portion facing the liquid crystal panel, and the light absorbing layer may absorb light leaked from the side surface of the liquid crystal panel.

In accordance with another exemplary embodiment disclosed herein, the display may include a frame accommodating a backlight unit and a liquid crystal panel therein, and the separation-preventing member may be coupled to the frame.

In accordance with another exemplary embodiment disclosed herein, the mobile terminal may further include a case accommodating the window therein, and the separation-preventing member may be provided with a coupling boss provided on a rear surface thereof for coupling with the case.

The separation-preventing member may include a bending portion bent from a base covering the rear surface of the display to overlap an inner side surface of the case. Here, the bending portion may include stopping grooves by which stopping hooks provided on the inner side surface of the case are stopped.

The mobile terminal may further include a molding portion integrally coupled with the separation-preventing member by double injection and having the coupling boss.

The molding portion may include an accommodating portion providing a mounting space for a receiver, which outputs sounds through an audio hole formed at the window.

The mobile terminal may further include an elastic member integrally coupled with the molding portion by double injection. The elastic member may come in contact with the rear surface of the window to absorb an impact when an impact is applied to the window.

A coupling hole may be formed on a side surface of the case, and the case may be coupled to the molding portion by a screw, which is inserted through the coupling hole and coupled to the coupling boss.

In accordance with another exemplary embodiment disclosed herein, the window may be curved along a lengthwise direction thereof. A printed circuit board may be disposed on the rear surface of the separation-preventing member and be curved to correspond to the curved rear surface of the window. First and second guide rails may be provided at both sides of the printed circuit board in a widthwise direction of the printed circuit board, so as to fix the printed circuit board. Here, the first and second guide rails may be formed to correspond to a curved shape of the printed circuit board.

The mobile terminal may further include a reinforcing member coupled to each of the first and second guide rails to reinforce rigidities of the first and second guide rails.

The mobile terminal may further include a case disposed inclined with respect to the printed circuit board, and having a boss in which a coupling member is inserted to couple the case with the printed circuit board. Each of the first and second guide rails may include an elastic member having a coupling hole through which the coupling member is inserted. The coupling hole may be elastically deformable upon insertion of the coupling member.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
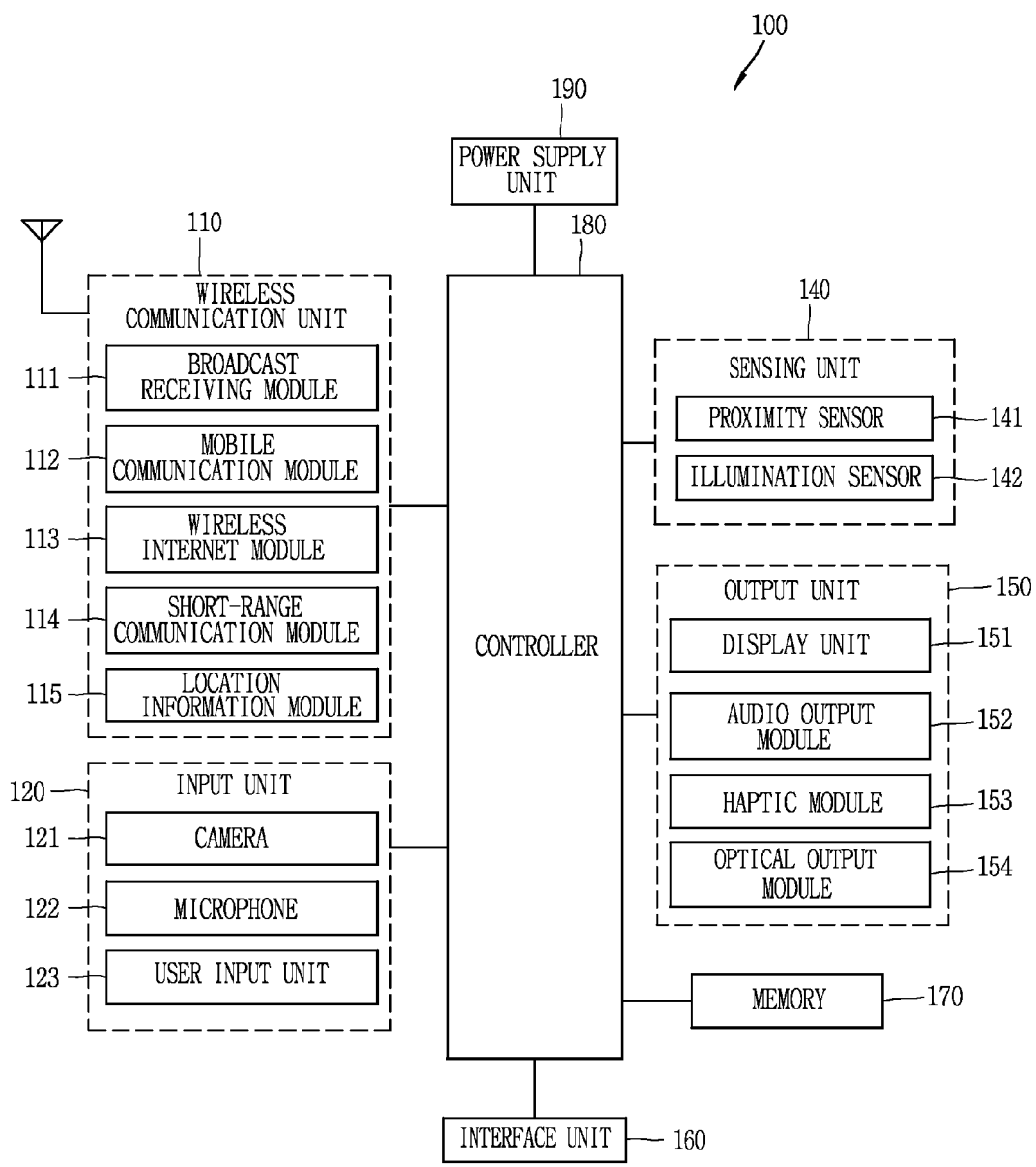
FIG. 1 is a block diagram of a mobile terminal in accordance with one exemplary embodiment of the present disclosure.

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. It should be understood that all changes and modifications that fall within the metes and bounds of the claims, or equivalents of such metes and bounds are therefore intended to be embraced by the appended claims.

The terms including an ordinal number such as first, second, etc. can be used to describe various elements, but the elements should not be limited by those terms. The terms are used merely for the purpose to distinguish an element from the other element.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal 100 in accordance with one embodiment of the present invention.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1 to execute an application program that have been stored in the memory 170. In addition, the controller 180 may combine at least two of components included in the mobile terminal 100 for operation, in order to activation of the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of those components may be cooperative to implement operations, controls or control methods of a mobile terminal in accordance with various exemplary embodiments disclosed herein. Also, the operations, controls or control methods of the mobile terminal may be implemented on the mobile terminal by the execution of at least one application program stored in the memory.

Hereinafter, various components depicted in this figure will now be described in more detail, prior to describing various embodiments implemented by the mobile terminal 100.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 may have a more extended lifespan and higher utilization than the contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
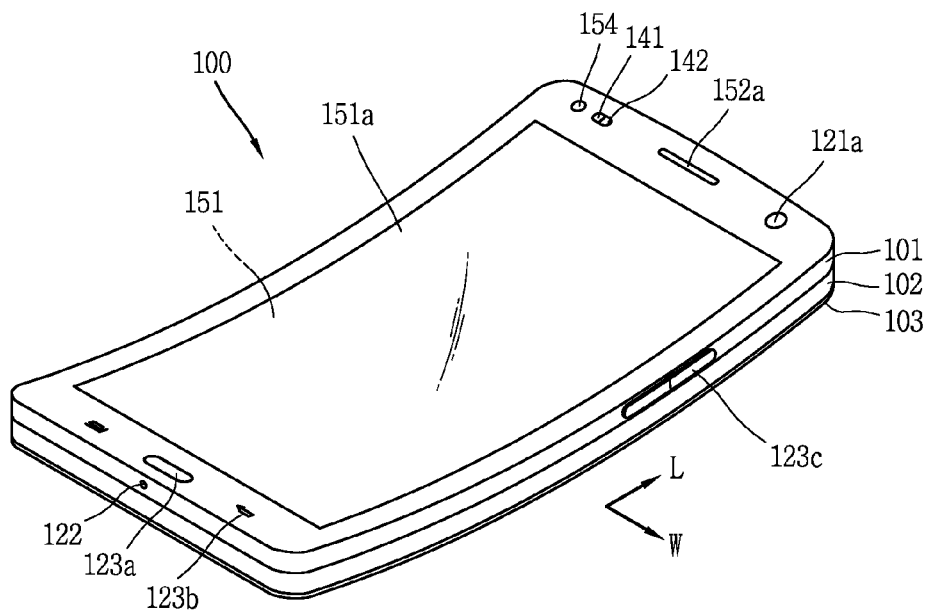
FIGS. 2 and 3 are conceptual views of one example of a mobile terminal, viewed from different directions, in accordance with the present disclosure.
Figure 3:
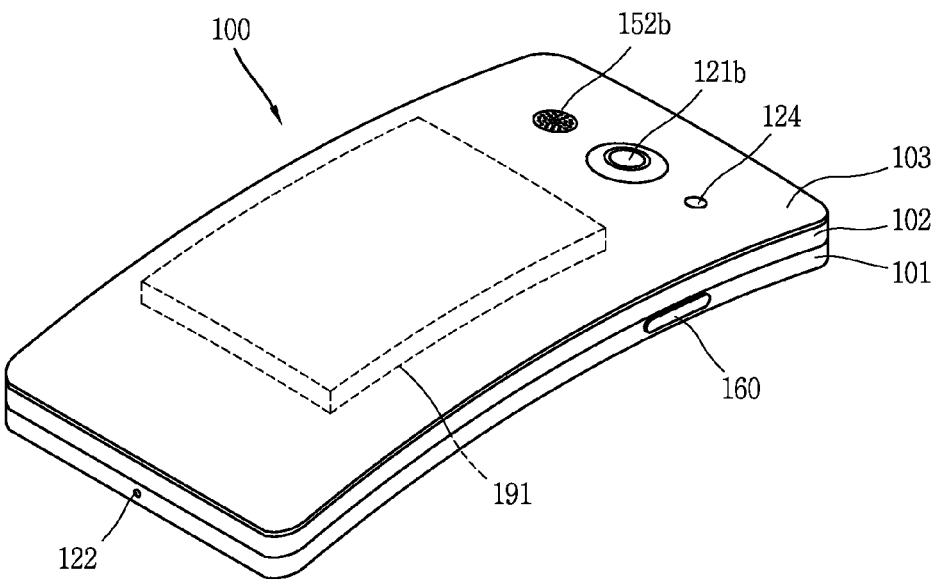

FIGS. 2 and 3 are conceptual views of one example of a mobile terminal 100, viewed from different directions, in accordance with the present disclosure.

Referring to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, regarding the mobile terminal 100 as at least one assembly (or set), the terminal body may be understood as a conception referring to the assembly (or the set).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having a display unit 151, first and second audio output modules 152a and 152b, a proximity sensor 141, an illumination sensor 142, an optical output module 154, first and second cameras 121a and 121b, a first manipulation unit 123a, 123b, a second manipulation unit 123c, a microphone 122, an interface unit 160, and the like.

Hereinafter, description will be given, as illustrated in FIGS. 2 and 3, of an exemplary embodiment of a mobile terminal, in which the display unit 151, the first audio output module 152a, the proximity sensor 141, the illumination sensor 142, the optical output module 154, the first camera 121a and the first manipulation units 123a and 123b are disposed on a front surface of a terminal body, the second manipulation unit 123c, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the instant disclosure. Some components may be omitted or rearranged. For example, the first manipulation unit 123a, 123b may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a, 123b.

The first audio output module 152a may be implemented in the form of a receiver to transfer voice audio to a user's ear, and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first manipulation unit 123a, 123b and the second manipulation unit 123c are examples of the user input unit 123, which may be manipulated by a user to provide input to the mobile terminal 100. The first and second manipulation units 123a,123b and 123c may also be commonly referred to as a manipulating portion, and may employ any tactile method that allows the user to perform manipulation such as touch, push, scroll, or the like. The first and second manipulation units 123a, 123b and 123c may also employ any non-tactile method that allows the user to perform manipulation such as proximity touch, hovering, or the like.

FIGS. 2 and 3 illustrate the first manipulation unit 123a, 123b as a combination of a mechanical key 123a and a touch key 123b.

Input received at the first manipulation unit 123a, 123b and the second manipulation unit 123c may be used in various ways. For example, the first manipulation unit 123a, 123b may be used by the user to provide an input to a menu, home key, cancel, search, or the like, and the second manipulation unit 123c may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a, 123b in the rear input unit. As such, in situations where the first manipulation unit 123a, 123b is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the display unit 151 according to the present disclosure may be formed in a curved shape along one direction of the terminal body, and this type is referred to as a curved display unit 151, hereinafter.

This exemplary embodiment illustrates that the curved display unit 151 is curved along a lengthwise direction L of the terminal body. That is, the curved display unit 151 may have a shape that both end portions adjacent to the first audio output module 152a and the microphone 122, respectively, are curved with respect to a central portion of the curved display unit 151. Unlike this, the display unit 151 may also be formed in a shape curved along a widthwise direction W of the terminal body.

In addition to the curved display unit 151 in the curved shape, the mobile terminal 100 may also be formed in the curved shape on the whole. Hereinafter, a device structure having the curved display unit 151 will be described in more detail with reference to the accompanying drawings.

Figure 4:
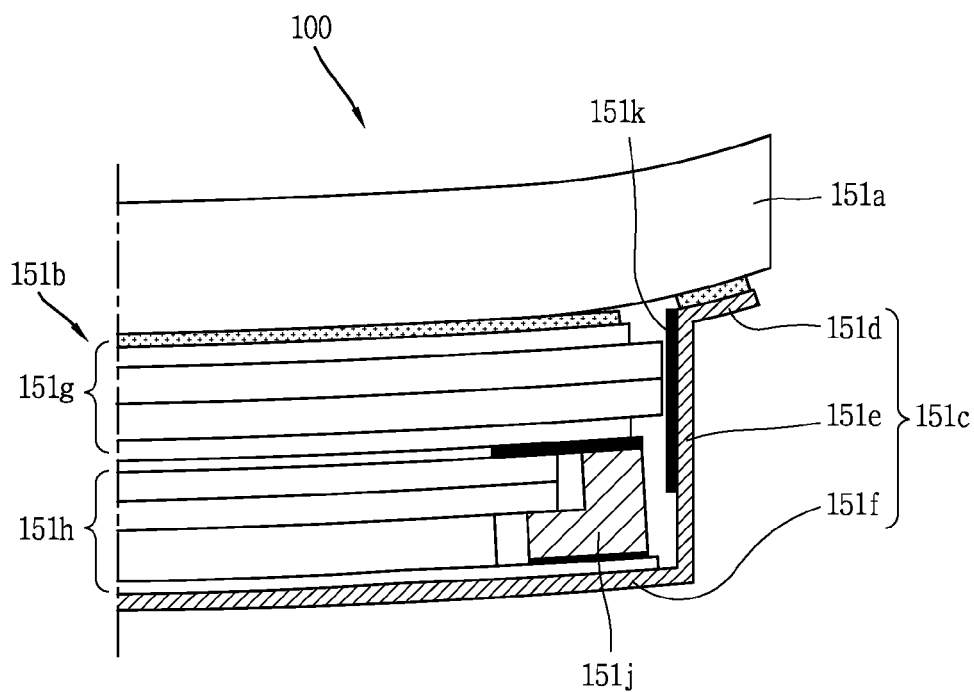
FIG. 4 is a sectional view illustrating one example of a curved display unit illustrated in FIG. 2.

FIG. 4 is a sectional view illustrating one example of the curved display unit illustrated in FIG. 2.

As illustrated in FIG. 4, the curved display unit 151 may be formed to be curved along one direction of the terminal body. The curved display unit 151 may include a window 151a, a display 151b, and a separation-preventing member 151c.

The window 151a may overlap the display 151b to form one surface of the terminal body. The window 151a may be formed of a transparent material, for example, light-transmittable synthetic resin, tempered glass, and the like. The window 151a may include a portion through which light cannot be transmitted.

A rear surface of the window 151a may be formed curved. For example, the window 151a may have a preset radius of curvature. Also, the window 151a may be elastically deformable in response to an external force applied.

The display 151b may be disposed on the rear surface of the window 151a, and output visual information through the window 151a. The display unit 151b may have an area corresponding to the light-transmittable region of the window 151a, such that the user can recognize the visual information output on the display 151b from the outside.

The display 151b may include a liquid crystal panel (LCD) 151g on which an image is output, a backlight unit 151h emitting light toward the LCD 151g, and a reflection member 151j surrounding the backlight unit 151h to reflect light which is leaked from a side surface of the backlight unit 151h.

The LCD 151g may include color filter (CF) glass and thin film transistor (TFT) glass, which are spaced apart from each other, a liquid crystal filled between the CF glass and the TFT glass, a polarizer disposed on an upper surface of the CF glass, and another polarizer disposed on a rear surface of the TFT glass.

The backlight unit 151h may include a light source, a light guide plate guiding light emitted from the light source, a reflection film disposed on a rear surface of the light guide plate, and a diffusion film and a prism sheet laminated on the light guide plate.

The reflection member 151j may be formed of a white synthetic resin material which reflects light. A shielding tape may be provided between the LCD 151g and the backlight unit 151h to prevent the leakage of light therebetween. The shielding tape may extend toward the reflection member 151j. The shielding tape may also be provided between the reflection member 151j and the reflection film.

The display 151b may be interlayered or integrally formed with a touch sensor, to implement a touch screen. The touch screen may provide an input interface as well as an output interface between the mobile terminal 100 and a user.

Between the window 151a and the display 151b may be provided an adhesive layer for adhering them onto each other. The adhesive layer may be made of optical clear adhesive (OCA), optical clear resin (OCR), and the like.

Meanwhile, the display 151b may be elastically deformable. There may be no problem in case where the display 151b is curved in response to the window 151a being curved. However, if the display 151b and the window 151a are slightly different in the radius of curvature or if the display 151b is produced in the form of a flat plate and then attached onto the rear surface of the window 151a, the display 151b may be likely to be separated from the window 151a due to differences in the radius curvature, a restoring force and the like.

To solve this, the separation-preventing member 151c may have one side coupled to the window 151a and the other side coupled to the display 151b, to prevent the display 151b from being separated from the window 151c in a direction that the window 151a and the display 151b are spaced apart from each other. By the coupling structure, the separation-preventing member 151c may receive a tensile force in the spaced direction.

The separation-preventing member 151c may be formed of a material which is elastically deformable. For example, the separation-preventing member 151c may be formed of a metal (for example, stainless steel). This may allow the separation-preventing member 151c to be elastically deformable and endure the tensile force. The separation-preventing member 151c may also be formed of synthetic resin having such characteristics.

Hereinafter, the structure of the separation-preventing member 151c will be described in more detail.

Figure 5:
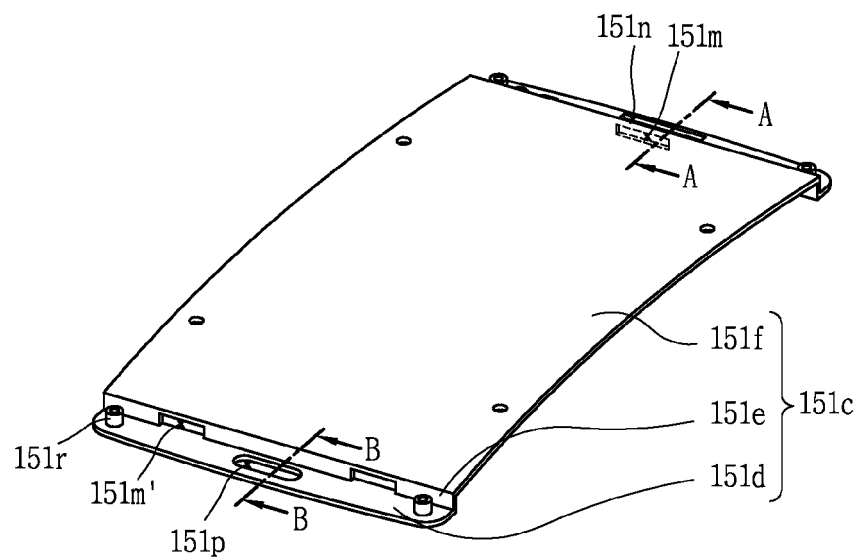
FIG. 5 is a view separately illustrating a separation-preventing member of the curved display unit of FIG. 4.

FIG. 5 is a view separately illustrating the separation-preventing member 151c of the curved display unit 151 of FIG. 4.

As illustrated in FIG. 5, the separation-preventing member 151c may include a coupling portion 151d, a connecting portion 151e, and a supporting portion 151f, which are integrally formed as a single member. For example, a stainless steel plate may be bent by press molding, so as to be formed as the separation-preventing member 151c having the coupling portion 151d, the connecting portion 151e and the supporting portion 151f.

The coupling portion 151d may be coupled to the rear surface of the window 151a. An adhesive layer may be provided between the window 151a and the coupling portion 151d to adhere them onto each other. To prevent the separation between the window 151a and the coupling portion 151d, the coupling portion 151d may be formed in a curved shape corresponding to the curved rear surface of the window 151a.

The connecting portion 151e may extend in a bent manner from the coupling portion 151d so as to cover at least one side surface of the display 151b. FIG. 5 exemplarily illustrates that the connecting portion 151e extend from each of both sides of the coupling portion 151d to cover each of both sides of the display 151b. However, the present disclosure may not be limited to this. The connecting portion 151e may also be formed to cover every side surface of the display 151b.

Meanwhile, referring back to FIG. 4, a light-absorbing layer 151k for absorbing light leaked from the side surface of the LCD 151g may be disposed on an inner side surface of the connecting portion 151e which faces the LCD 151g. The light-absorbing layer 151k may be implemented as a printed layer, a film or the like having a black color, to absorb light at the inner surface.

The supporting portion 151f may extend in a bent manner from the connecting portion 151e, to cover at least part of the rear surface of the display 151b. According to the structure, the supporting portion 151f may support the display 151b. An adhesive layer may be provided between the display 151b and the supporting portion 151f to adhere them onto each other. In the exemplary drawing, the supporting portion 151f fully covers the rear surface of the display 151b.

On the other hand, the supporting portion 151f may be formed to cover a part of the rear surface of the display 151b. For example, the supporting portion 151f may be formed in a rectangular shape to cover edges of the rear surface of the display 151b except for a central portion of the rear surface of the display 151b.

Meanwhile, the separation-preventing member 151c may be provided with coupling bosses 151r or coupling holes so as to be coupled with an internal structure or a component (for example, the case 101, 102, a printed circuit board 181, etc.). Such coupling structure will be explained later.

Figure 6:
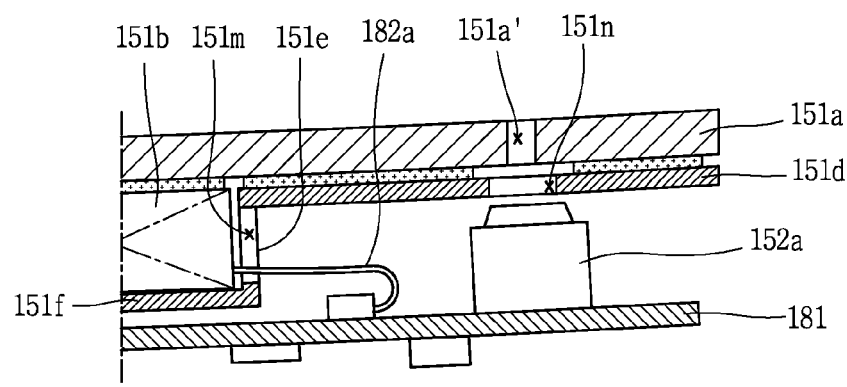
FIG. 6 is a sectional view taken along the line A-A of FIG. 5.

FIG. 6 is a sectional view taken along the line A-A of FIG. 5.

As illustrated in FIG. 6, a printed circuit board (PCB) 181 may be disposed on a rear surface of the separation-preventing member 151c. The PCB 181 may be implemented as one example of the controller 180 (see FIG. 1) for operating various functions of the mobile terminal 100. Various electronic components may be mounted onto at least one surface of the PCB 181. As illustrated in FIG. 6, the first audio output module 152a may be mounted on the PCB 181.

The display 151b may be electrically connected to the PCB 181 through a flexible PCB (FPCB) 182a. The FPCB 182a may extend from one side of the display 151b. The connecting portion 151e may be provided with a hole 151m, through which the FPCB 182a is inserted to electrically connect the display 151b and the PCB 181 to each other. With the structure, the hole 151m may be formed on the connecting portion 151e which faces a side surface of the display 151b, such that the FPCB 182a extending from the side surface of the display 151b can be connected to the PCB 181 in the least bent state.

Meanwhile, the window 151a may be provided with an audio hole 151a' through which sounds are output, and the first audio output module 152a which outputs the sounds may be installed on the PCB 181. An audio guide hole 151n which guides the sounds output from the first audio output module 152a may be formed on a portion of the coupling portion 151d corresponding to the audio hole 151a'. Or, a cut portion may be formed on the portion of the coupling portion 151d corresponding to the audio hole 151a'.

Figure 7:
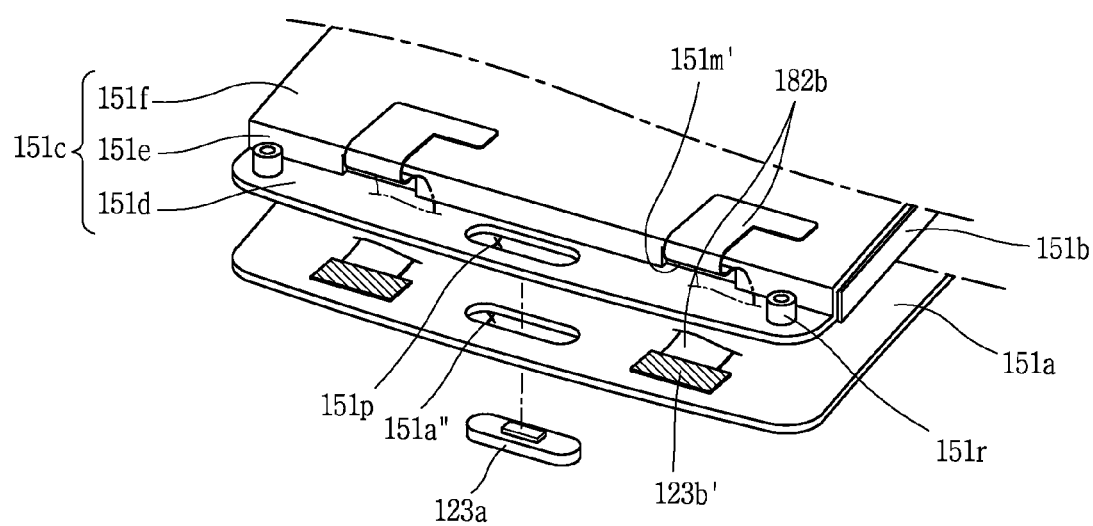
FIG. 7 is a disassembled perspective view of a part B illustrated in FIG. 5.

FIG. 7 is a disassembled perspective view of a part B illustrated in FIG. 5.

As illustrated in FIG. 7, a key hole 151a" for receiving a mechanical key 123a which is manipulated in a pressing manner may be formed through the window 151a. The key hole 151a" and the audio hole 151a' may be formed at both end portions of the window 151a, respectively.

A through hole 151p corresponding to the key hole 151a" may be formed through the coupling portion 151d. The through hole 151p may fully surround an outer circumference of the mechanical key 123a received therein.

With the structure, the coupling portions 151d may be disposed at both sides of the display 151b along the lengthwise direction of the display 151b, and the audio guide hole 151n and the through hole 151p may be formed on the both coupling portions 151d, respectively.

Meanwhile, as aforementioned, the window 151a may be provided with touch keys 123b (see FIG. 2). This exemplary embodiment illustrates that the touch keys 123b are disposed at both sides of the mechanical key 123a. Touch sensors 123b' may be disposed on the rear surface of the window 151a, corresponding to the touch keys 123b, so as to sense touch inputs onto the touch keys 123b. The touch sensor 123b' may be formed in the form of a film so as to be attached onto the rear surface of the window 151a, or directly printed on the rear surface of the window 151a in the form of a pattern.

Each of the touch sensors 123b' may be electrically connected to the PCB 181 through the FPCB 182b. The connecting portion 151e may be provided with a hole 151m' through which the FPCB 182b is inserted to electrically connect the touch sensor 123b' and the PCB 181 to each other.

FIG. 7 exemplarily illustrates that the FPCB 182b is provided in plurality to correspond to the plurality of touch keys 123b, respectively. The plurality of FPCBs 182b may extend through adjacent holes 151m', respectively. Unlike to this embodiment, the FPCB 182b may be implemented as a single FPCB 182b which is electrically connected to each of the plurality of touch keys 123b.

In the meantime, an insulating member (not illustrated) may be disposed between the touch sensor 123b' and the coupling portion 151d for blocking an electric connection therebetween.

Hereinafter, other examples of the curved display unit 151 will be described.

Figure 8:
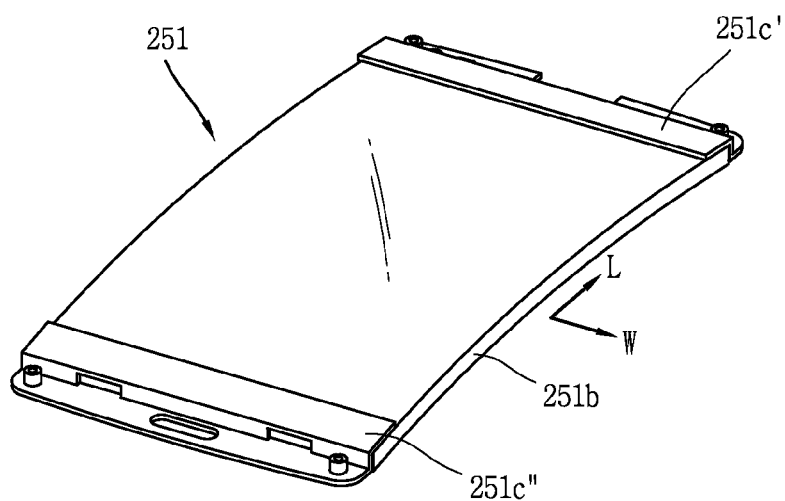
FIG. 8 is a conceptual view illustrating another example of a curved display unit illustrated in FIG. 2.

FIG. 8 is a conceptual view illustrating another example of the curved display unit 151 illustrated in FIG. 2.

As illustrated in FIG. 8, a window (not illustrated) may be curved along a first direction (e.g., a lengthwise direction L in FIG. 8) of the terminal body. A separation-preventing member may include a first separation-preventing portion 251c' and a second separation-preventing portion 251c" which are disposed at both end portions of the window along a first direction of the window. The first and second separation-preventing portions 251c' and 251c" may extend along a second direction perpendicular to the first direction.

FIG. 8 exemplarily illustrates that the first separation-preventing portion 251c' and the second separation-preventing portion 251c" are provided separate from each other, and coupled to both sides of a display 251b, respectively. With the structure, the first and second separation-preventing portions 251c' and 251c" which prevent the separation may be provided merely at both sides of the display 251b directly coupled to the window, thereby minimizing the use of the separation-preventing member. This may result in a reduction of fabricating costs.

On the other hand, the first separation-preventing portion 251c' and the second separation-preventing portion 251c" may be connected to each other so as to cover a rear surface of the display 251b. This structure may be understood as the same as the aforementioned structure.

Figure 9:
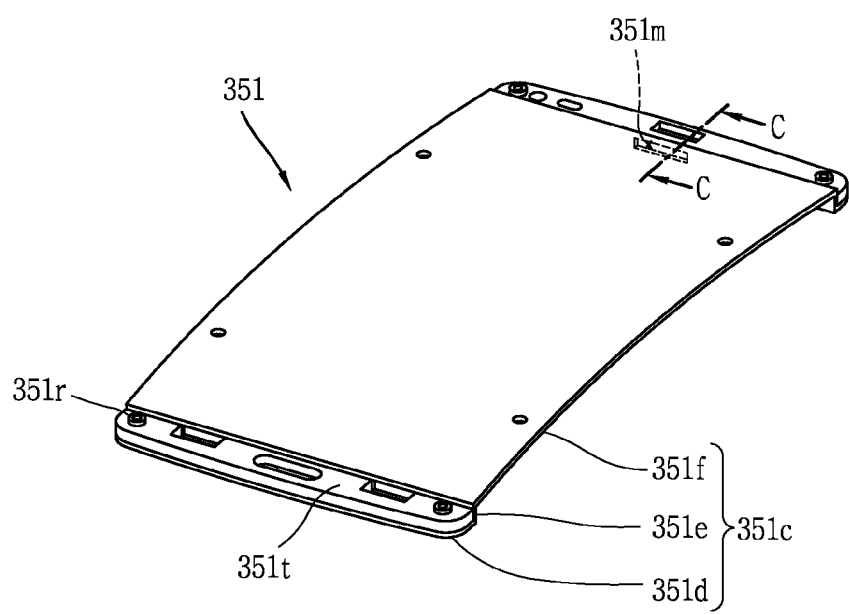
FIG. 9 is a conceptual view illustrating another example of a curved display unit illustrated in FIG. 2.
Figure 10:
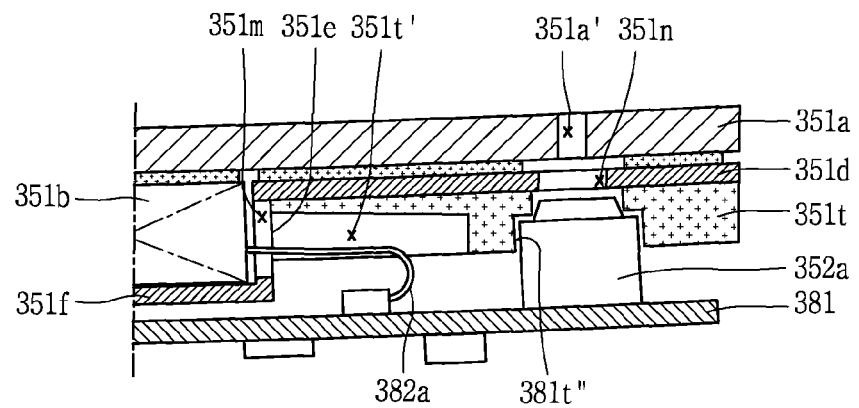
FIG. 10 is a sectional view taken along the line C-C of FIG. 9.

FIG. 9 is a conceptual view illustrating another example of a curved display unit 351, and FIG. 10 is a sectional view taken along the line C-C of FIG. 9.

As illustrated in FIGS. 9 and 10, a molding portion 351t may be integrally coupled with a separation-preventing member 351c by double injection. For example, the molding portion 351t may be formed to cover at least part of a coupling portion 351d, or in some cases, to cover the connecting portion 351e. FIGS. 9 and 10 illustrate that the molding portion 351t is disposed on a rear surface of the coupling portion 351d. With the structure, the window 351a may be directly coupled to the coupling portion 351d which is externally exposed.

The molding portion 351t may be provided with coupling bosses 351r or coupling holes so as to be coupled with an internal structure or a component (for example, a case, a printed circuit board (PCB) 381, etc.). For example, the coupling bosses 351r may be integrally coupled to the molding portion 351t by insert molding.

As aforementioned, a connecting portion 351e may be provided with a hole 351m through which a FPCB 382a is inserted to electrically connect the display 351b and the PCB 381. Here, a communication recess 351t' may be formed at a part of the molding portion 351t corresponding to the hole 351m, so as to communicate with the hole 351m, such that the FPCB 382a is inserted therealong.

Figure 11:
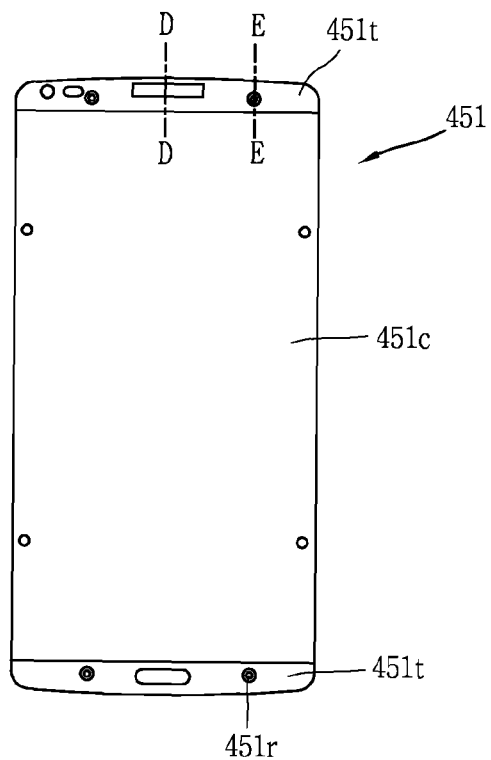
FIG. 11 is a conceptual view illustrating another example of a curved display unit illustrated in FIG. 2.
Figure 12:
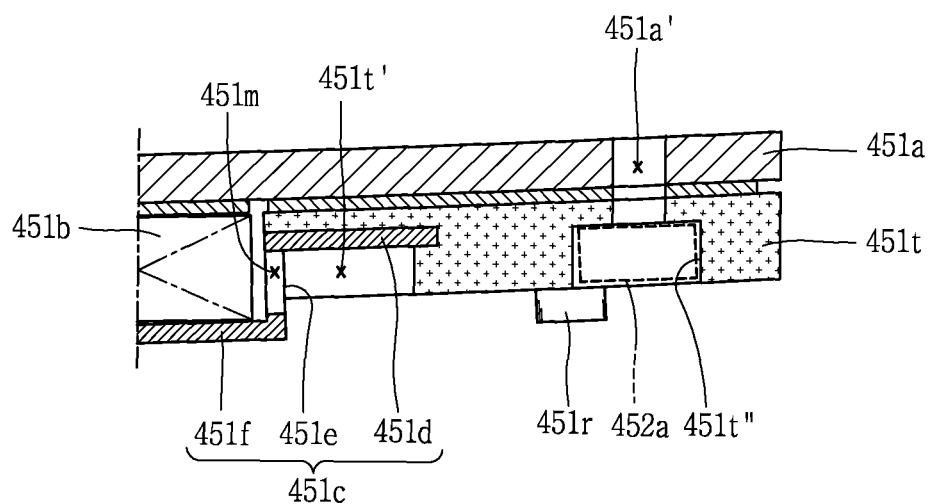
FIG. 12 is a sectional view taken along the line D-D of FIG. 11.
Figure 13:
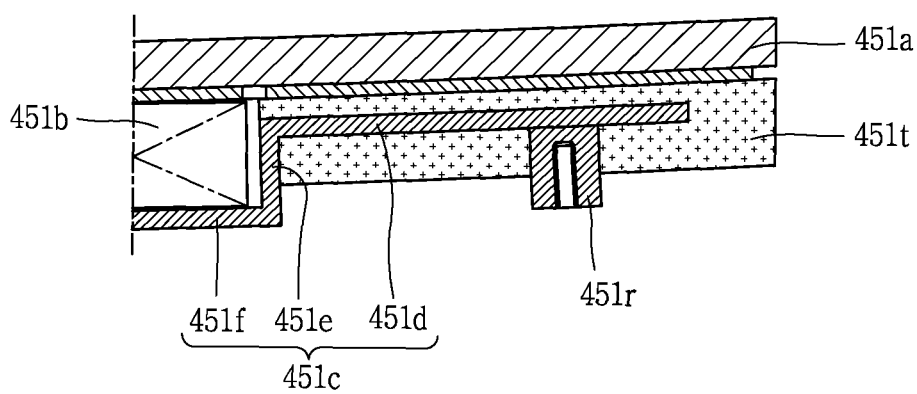
FIG. 13 is a sectional view taken along the line E-E of FIG. 11.

FIG. 11 is a conceptual view illustrating another example of a curved display unit 451, FIG. 12 is a sectional view taken along the line D-D of FIG. 11, and FIG. 13 is a sectional view taken along the line E-E of FIG. 11.

As illustrated in FIG. 11, similar to the previous embodiments, a molding portion 451t may be integrally coupled to a separation-preventing member 451c. However, this exemplary embodiment is different from the previous embodiments, as illustrated in FIGS. 12 and 13, in that the molding portion 451t covers both surfaces of a coupling portion 451d. Therefore, a window 451a may be directly coupled to the molding portion 451t. In this case, to prevent the separation between the window 451a and the molding portion 451t, one surface of the molding portion 451t which faces a rear surface of the window 451a may be formed in a curved shape.

Referring to FIG. 12, an accommodating portion 451t" which provides a mounting space for a first audio output module 452a may be formed at the molding portion 451t. The first audio output module 452a may be mounted in the accommodating portion 451t" to output sounds. The accommodating portion 451t" may be provided with a guide hole disposed to face an audio hole 451a', so as to guide sounds output from the first audio output module 452a toward the audio hole 451a'.

Unlike the previous embodiments in which the audio guide hole 151n, 351n is provided at the coupling portion 151d, 351d, the guide hole may be provided at the molding portion 451t. Here, a cut portion may be formed at a part of the coupling portion 451d corresponding to the guide hole.

Referring to FIG. 13, the molding portion 451t may be provided with coupling bosses 451r or coupling holes so as to be coupled with an internal structure or a component (for example, a case, a printed circuit board, etc.). For example, the coupling boss 451r may be inserted into the molding portion 451t and integrally coupled to the molding portion 451r.

Figure 14:
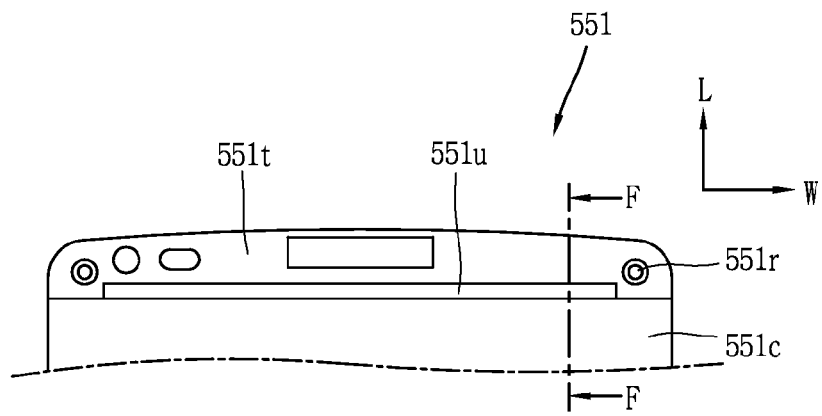
FIG. 14 is a conceptual view illustrating another example of a curved display unit illustrated in FIG. 2.
Figure 15:
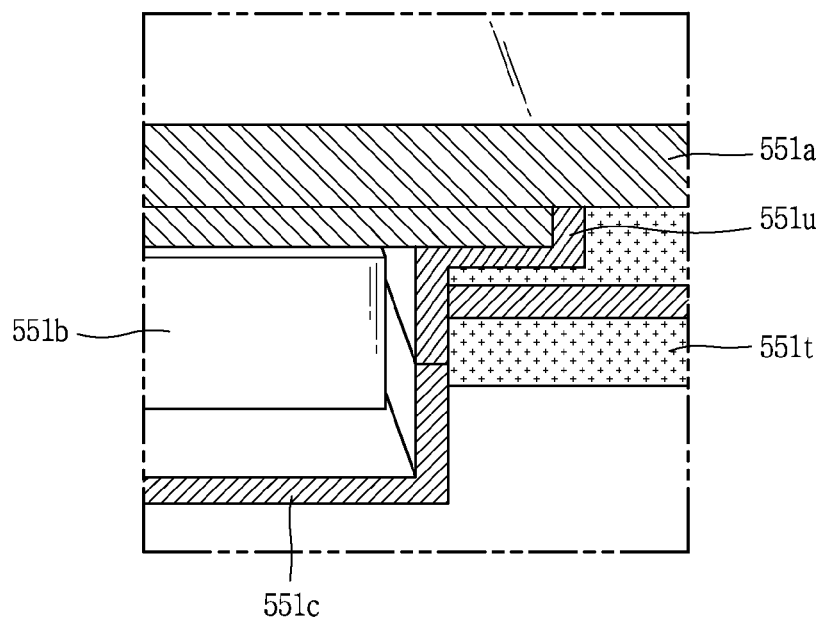
FIG. 15 is a sectional view taken along the line F-F of FIG. 14.

FIG. 14 is a conceptual view illustrating another example of a curved display unit 551, and FIG. 15 is a sectional view taken along the line F-F of FIG. 14.

As illustrated in FIGS. 14 and 15, similar to the previous embodiments, a molding portion 551t may be integrally coupled to a separation-preventing member 551c. Also, an elastic member 551u may be integrally coupled to the molding portion 551t by double injection (actually corresponding to triple injection, considering all of the separation-preventing member 551c, the molding portion 551t and the elastic member 551u). The elastic member 551u may come in contact with a rear surface of a window 551a to absorb an impact upon the impact applied onto the window 551a.

FIGS. 14 and 15 exemplarily illustrate that the elastic member 551u extends along a widthwise direction W of a terminal body. Unlike to those drawings, the elastic member 551u may be disposed to cover an entire upper surface of the molding portion 551t to come in contact directly with the window 551a. In this case, the elastic member 551u may allow the window 551 and the separation-preventing member 551c to be flexibly coupled to each other.

As briefly mentioned above, the separation-preventing member may have a structure for connecting electronic components or fixing internal structures. Hereinafter, the structure will be described in more detail with reference to the accompanying drawings.

Figure 16:
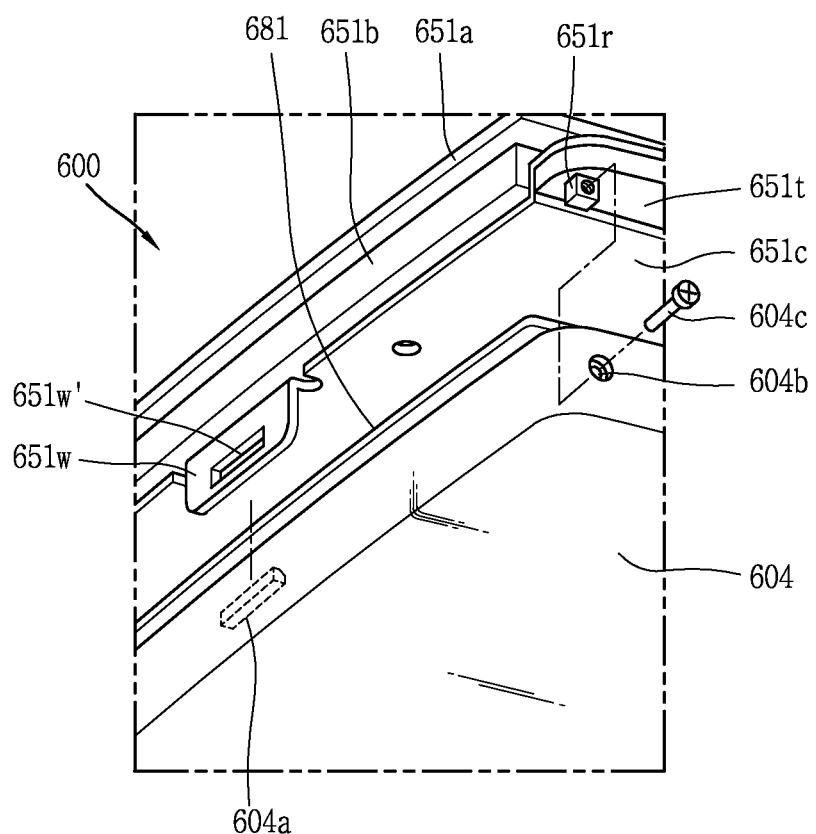
FIG. 16 is a conceptual view illustrating one example of a structure that a curved display unit illustrated in FIG. 2 is coupled to a case.

FIG. 16 is a conceptual view illustrating one example of a structure that a curved display unit is coupled to a case.

As illustrated in FIG. 16, a separation-preventing member 651c may have a structure for coupling with a case 604.

For example, the separation-preventing member 651c may be provided with a bending portion 651w, which is bent from a base covering a rear surface of a display 651b so as to overlap an inner side surface of the case 604. The bending portion 651w may be provided with a stopping hole 651w', such that a stopping hook 604a disposed on the inner side surface of the case 604 is stopped thereby.

As another example, upon coupling between the separation-preventing member 651c and the case 604, the molding portion 651t may be covered by the side surface of the case 604. A coupling boss 651r may protrude from the molding portion 651t to face the inner side surface of the case 604.

A coupling hole 604b may be formed on a side surface of the case 604. A screw 604c may be inserted through the coupling hole 604b to be coupled to the coupling boss 651r, such that the case 604 and the molding portion 651t are coupled to each other.

In such a manner, FIG. 16 exemplarily illustrates a combination of two coupling structures, but the present application may not be limited to this. The mobile terminal 100 may also be provided with at least one of the two coupling structures.

Meanwhile, FIG. 16 exemplarily illustrates that various types of electronic elements including a PCB 681 are disposed in an inner space formed between the separation-preventing member 651c and the case 604. Also, as illustrated in FIG. 16, when the case 604 is formed as a single case, a uni-body mobile terminal 600 can be implemented by coupling the case 604 and the separation-preventing member 651c to each other.

Figure 17:
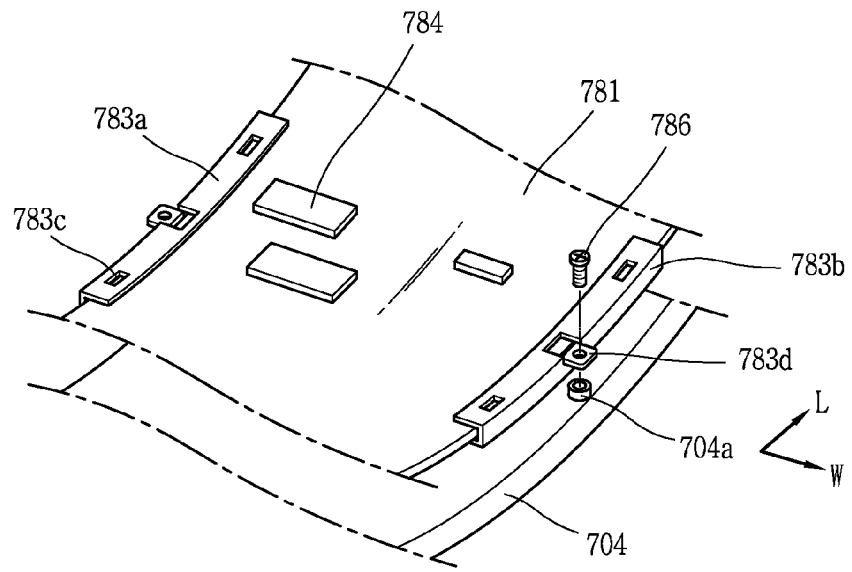
FIG. 17 is a conceptual view illustrating one example of a structure that a printed circuit board (PCB) mounted in the mobile terminal of FIG. 2 is coupled to a case.

FIG. 17 is a conceptual view illustrating one example of a structure that a printed circuit board 781 mounted in a mobile terminal is coupled to a case 704.

As illustrated in FIG. 17, as aforementioned, a PCB 781 may be provided on a rear surface of a separation-preventing member, and the PCB 781 may be formed to be curved in response to a rear surface of a window being curved. FIG. 17 exemplarily illustrates that the PCB 781 has a curved shape along a lengthwise direction L thereof.

First and second guide rails 783a and 783b which are formed to correspond to the curved PCB 781 may be provided at both sides in a widthwise direction W of the PCB 781. Each of the first and second guide rails 783a and 783b may be formed in a shape of 'ㄷ' to cover front, side and rear surfaces of the PCB 781, and bent to correspond to the curved PCB 781.

The first and second guide rails 783a and 783b may be coupled to another internal structure to secure a position of the PCB 781. Also, even if the mobile terminal is deformed due to an external force applied thereto, such rails may restrict a curved degree of the mobile terminal, thereby preventing an occurrence of problems, such as damages, component separation and the like, caused due to impact and deformation.

Meanwhile, in this exemplary embodiment, the PCB 781 may have the curved shape along the lengthwise direction L, and have a relatively flat shape along the widthwise direction W. Thus, to prevent a component separation due to the curved PCB 781 by use of the shape of the PCB 781, an electronic component 784 mounted onto the PCB 781 may be arranged such that a long side thereof extends along the widthwise direction W.

Or, the PCB 781 may have a shape in which a central portion is curved by a predetermined radius of curvature and both end portions are flat. In this case, the electronic component 784 mounted to the PCB 781 may be arranged on the both end portions except for the central portion. If the electronic component 784 is considerably short in width and long in length, the electronic component 784 may be arranged even on the central portion in a manner that a long side thereof extends along the widthwise direction W.

Figure 18:
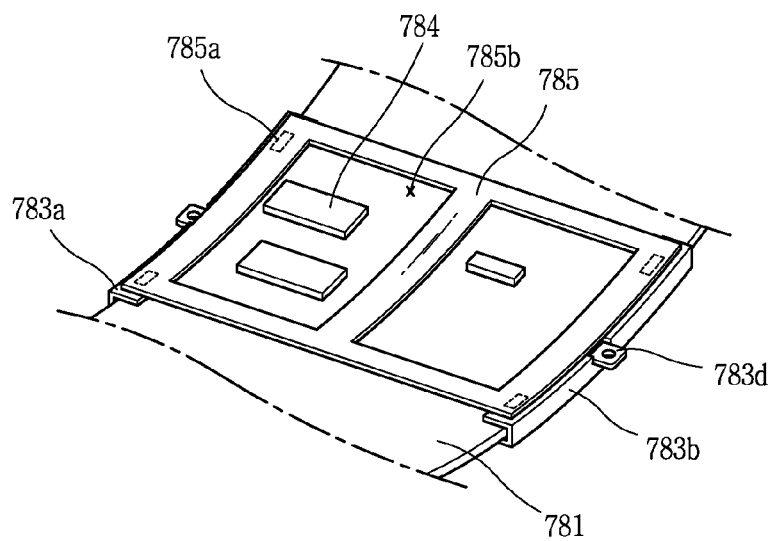
FIG. 18 is a conceptual view illustrating an example that a reinforcing member is coupled to first and second guide rails illustrated in FIG. 17.

FIG. 18 is a conceptual view illustrating an example that the first and second guide rails 783a and 783b illustrated in FIG. 17 are coupled to a reinforcing member 785.

Referring to FIG. 18 along with FIG. 17, a reinforcing member 785 may be installed on the first and second guide rails 783a and 783b to reinforce rigidities of the first and second guide rails 783a and 783b. Stopping grooves 783c may be formed on each of the first and second guide rails 783a and 783b, and stopping hooks 785a which are stopped in the stopping grooves 673c may be provided on the reinforcing member 785.

The reinforcing member 785 may be disposed to cover one surface of the PCB 781, and provided with an opening 785b through which the electronic components 784 mounted to the PCB 781 are exposed.

Figure 19:
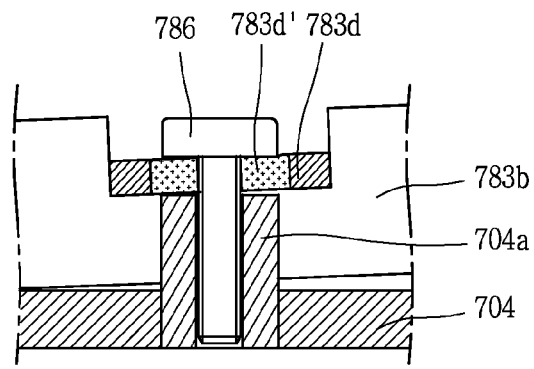
FIG. 19 is a sectional view taken through the coupling member of FIG. 17.

FIG. 19 is a sectional view taken through the coupling member of FIG. 17.

Referring to FIG. 19 along with FIG. 17, the first and second guide rails 783a and 783b may be coupled to an internal structure such that the position of the PCB 781 can be fixed. FIG. 19 exemplarily illustrates a structure that the second guide rail 783b is coupled to a case 704.

The coupling structure will now be described in detail with reference to the drawings. The case 704 may also be configured to be curved along with the PCB 781. However, due to a difference in a curved degree, the case 704 may be inclined with respect to the PCB 781. The case 704 may be provided with bosses 704a in which coupling members 786 for coupling with the PCB 781 are inserted.

The second guide rail 783b may be provided with a coupling portion 783d. The coupling portion 783d may protrude from a main body of the second guide rail 783b. The coupling portion 783d may be provided with an elastic member 783d' having a coupling hole through which the coupling member 786 is inserted. Accordingly, the coupling hole can be elastically deformed upon the insertion of the coupling member 786. Therefore, even if an axis of the boss 704a and an axis of the coupling hole are slightly misaligned, the elastic member 783d' may be deformed to maintain the coupled state.

With the structure, members which are curved by different curved levels can be coupled to each other by use of the coupling member 786. Also, even if the mobile terminal is deformed due to an external force applied thereto, a coupling force may not be weakened.

Figure 20:
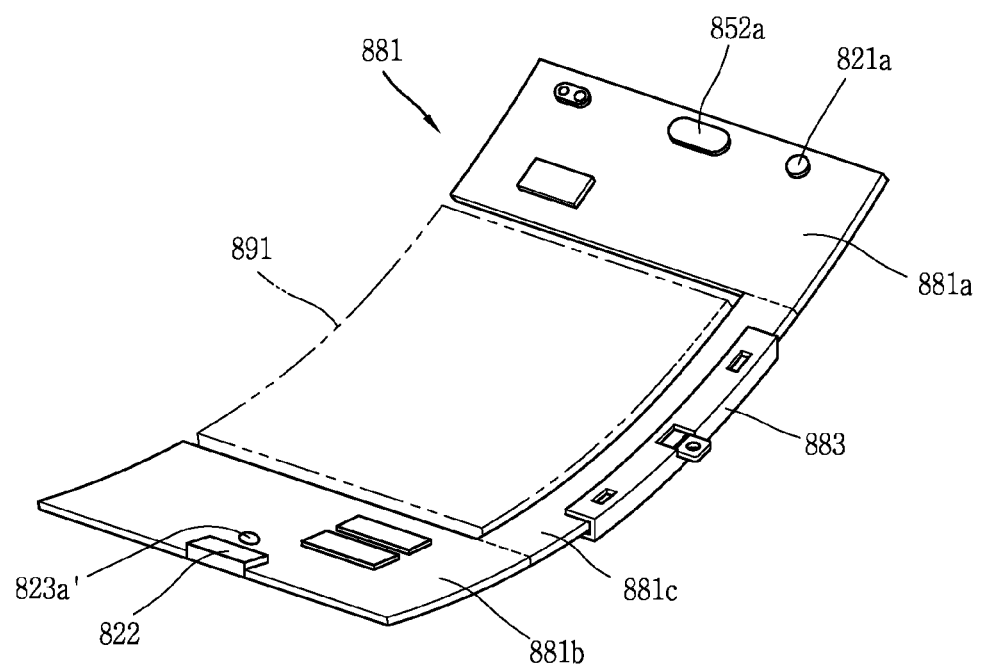
FIG. 20 is a conceptual view illustrating another example of a structure of a printed circuit board (PCB) mounted in the mobile terminal of FIG. 2.

FIG. 20 is a conceptual view illustrating another example of a structure of a printed circuit board 881 mounted in the mobile terminal.

As illustrated in FIG. 20, a PCB 881 may include a first substrate 881*a* and a second substrate 881*b* spaced from each other, and a connecting portion 881*c* interconnecting the first substrate 881*a* and the second substrate 881*b*.

The connecting portion 881*c* may have a curved shape by a predetermined radius of curvature, and the first and second substrates 881*a* and 881*b* arranged at both sides of the connecting portion 881*c* may have a flat shape. The connecting portion 881*c* may be formed of a flexible material, and be integrally formed with the first and second substrates 881*a* and 881*b* by double injection. FIG. 20 exemplarily illustrates that one connecting portion 881*c* is disposed to extend along one side of a display (not illustrated), but the present disclosure may not be limited to this. The connecting portion 881*c* may additionally be provided even at the other side of the display.

As the first and second substrates 881*a* and 881*b* have the flat shape, various types of electronic components may be mounted to the first and second substrates 881*a* and 881*b*. For example, a camera 821*a*, a first audio output module 852*a* and the like may be disposed on the first substrate 881*a*, and a dome switch 823*a*' of a mechanical key, a microphone 822 and the like may be disposed on the second substrate 881*b*.

A battery 891 may be received in a space which is limited by the first substrate 881*a*, the connecting portion 881*c*, and the second substrate 882*b*. That is, at least part of the battery 891 may be surrounded by the first substrate 881*a*, the connecting portion 881*c*, and the second substrate 882*b*.

Meanwhile, the connecting portion 881*c* may be coupled with a guide rail 883, and the guide rail 883 may be coupled with an internal structure, thereby fixing the position of the PCB 881.

Figure 21:
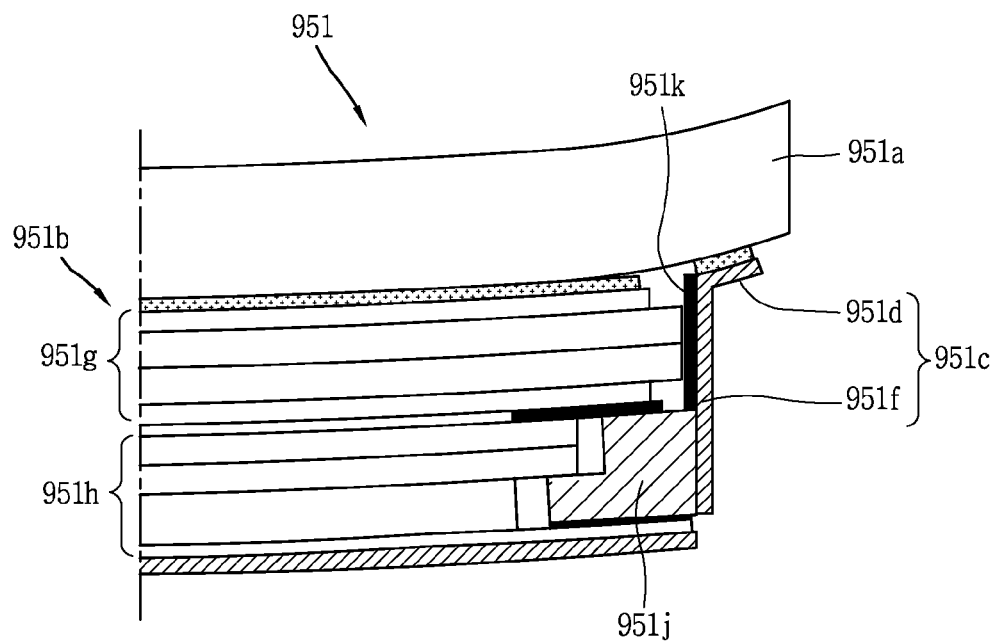
FIGS. 21 and 22 are conceptual views illustrating other examples of a curved display unit illustrated in FIG. 2.
Figure 22:
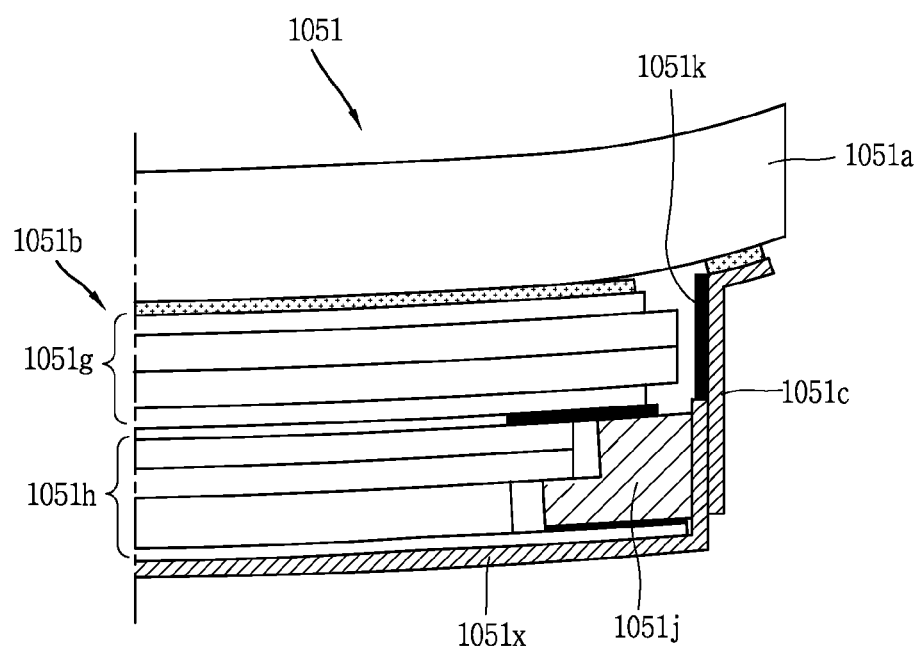

FIGS. 21 and 22 are conceptual views illustrating other examples of curved display units 951 and 1051. Hereinafter, description will be mainly given of a structure of restricting a display 951*b*, 1051*b* from being separated from a window 951*a*, 1051*a*. The aforementioned structures may be equally applied to the mobile terminal according to this exemplary embodiment, unless otherwise being logically contradictory from this exemplary embodiment. Therefore, repetitive description will be omitted.

First, referring to FIG. 21, a separation-preventing member 951*c* may be coupled to a window 951*a* and a reflecting portion 951*j*, respectively, so as to restrict the display 951*b* from being separated from the window 951*a* in a direction that the window 951*a* and the display 951*b* are spaced apart from each other.

In more detail, the separation-preventing member 951*c* may include a first coupling portion 951*d* and a second coupling portion 951*f*.

The first coupling portion 951*d* may be coupled to a rear surface of the window 951*a*. An adhesive layer may be provided between the window 951*a* and the first coupling portion 951*d* to adhere them onto each other. To prevent the separation between the window 951*a* and the first coupling portion 951*d*, the first coupling portion 951*d* may be curved to correspond to a curved shape of the rear surface of the window 951*a*.

A second coupling portion 951*f* may extend in a bent manner from the first coupling portion 951*d* to cover the display 951*b*, and a part of the second coupling portion 951*f* may be integrally coupled with a reflection member 951*j* by double injection.

Meanwhile, a light absorbing layer 951*k* which absorbs light leaked from a side surface of an LCD 951*g* may be provided on an inner surface of the second coupling portion 951*d* which faces the LCD 951*g*. The light absorbing layer 951*k* may be implemented as a printed layer, a film or the like having a black color, to absorb light at the inner surface.

Referring to FIG. 22, a display 1051*b* may be provided with a frame 1051*x* which accommodates a backlight unit 1051*h* and an LCD 1051*g* therein. The frame 1051*x* may be formed of a metal (for example, stainless steel) having high rigidity as compared with a thickness thereof.

A separation-preventing member 1051*c* may be coupled to both of a window 1051*a* and the frame 1051*x*, so as to prevent the display 1051*b* from being separated from the window 1051*a* in a direction that the window 1051*a* and the display 1051*b* are spaced apart from each other.

As described above, a display may be kept attached on a rear surface of a window, which is formed in a curved shape, by virtue of a separation-preventing member. Also, the separation-preventing member or a molding portion coupled to the separation-preventing member may have a structure for connecting electronic components or fixing structures. In addition, a new device structure having a curved display unit may result in an implementation of a structurally-stable mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a terminal body;
   a window provided on the terminal body, the window having a rear surface formed in a curved shape;
   a display having a front surface defining a first portion mounted to the rear surface of the window, the display configured to output visual information visible through the window; and
   a separation-preventing member configured to prevent the display from being separated from the window in a direction away from the rear surface of the window, the separation-preventing member including:
      a first portion coupled to the rear surface of the window; and
      a second portion coupled to a second portion of the display.

2. The mobile terminal of claim 1, wherein the separation-preventing member comprises:
   a coupling portion coupled to the rear surface of the window;
   a connecting portion extending from the coupling portion, the connecting portion covering at least one side surface of the display; and
   a supporting portion extending from the connecting portion, the supporting portion supporting at least part of a rear surface of the display.

3. The mobile terminal of claim 2, wherein the coupling portion has a curved shape corresponding to the curved shape of the rear surface of the window.

4. The mobile terminal of claim 2, wherein the window comprises at least one key hole therein to accommodate a mechanical key which is manipulated in a pushing manner, and
wherein the coupling portion comprises at least one through hole located to correspond to the key hole, the through hole surrounding an entire outer periphery of the mechanical key.

5. The mobile terminal of claim 2, further comprising a printed circuit board provided on a rear surface of the separation-preventing member,
wherein the connecting portion comprises a hole for insertion of a flexible printed circuit board extending from one side of the display, and
wherein the flexible printed circuit board extends through the hole and electrically connects the display to the printed circuit board.

6. The mobile terminal of claim 1, wherein the window is curved along a first direction,
wherein the separation-preventing member comprises a first separation-preventing portion and a second separation-preventing portion provided at both end portions of the window in the first direction, respectively, and
wherein the first separation-preventing portion and the second separation-preventing portion extend along a second direction perpendicular to the first direction.

7. The mobile terminal of claim 6, wherein the first separation-preventing portion and the second separation-preventing portion are connected to each other so as to cover a rear surface of the display.

8. The mobile terminal of claim 1, wherein the display comprises:
a liquid crystal panel on which an image is output;
a backlight unit configured to emit light toward the liquid crystal panel; and
a reflection member disposed to surround at least a portion of a side surface of the backlight unit to reflect light leaked from the side surface of the backlight unit,
wherein the separation-preventing member is disposed to cover at least part of the reflection member.

9. The mobile terminal of claim 8, wherein the separation-preventing member comprises:
a first coupling portion coupled to the rear surface of the window; and
a second coupling portion extending from the first coupling portion, the second coupling portion disposed to surround the display,
wherein a portion of the second coupling portion is integrally coupled with the reflection member by double injection molding.

10. The mobile terminal of claim 9, further comprising a light absorbing layer provided on an inner side surface of the second coupling portion facing the liquid crystal panel,
wherein the light absorbing layer absorbs light leaked from the side surface of the liquid crystal panel.

11. The mobile terminal of claim 1, wherein the display comprises:
a liquid crystal panel;
a backlight unit; and
a frame accommodating the backlight unit and the liquid crystal panel therein,
wherein the separation-preventing member is coupled to the frame.

12. The mobile terminal of claim 1, further comprising a case accommodating the window therein,
wherein the separation-preventing member includes a coupling boss provided on a rear surface of the separation-preventing member for coupling the separation-preventing member to the case.

13. The mobile terminal of claim 12, wherein the separation-preventing member comprises a base portion covering a rear surface of the display, and a bending portion bent from the base portion to overlap an inner side surface of the case,
wherein the bending portion includes stopping grooves into which stopping hooks provided on the inner side surface of the case are inserted.

14. The mobile terminal of claim 12, further comprising a molding portion integrally coupled with the separation-preventing member,
wherein the molding portion includes the coupling boss.

15. The mobile terminal of claim 14, wherein the molding portion comprises an accommodating portion providing a mounting space for a receiver that outputs sounds through an audio hole formed at the window.

16. The mobile terminal of claim 14, further comprising an elastic member integrally coupled with the molding portion,
wherein the elastic member contacts the rear surface of the window to absorb an impact applied to the window.

17. The mobile terminal of claim 14, wherein a coupling hole is located in a side surface of the case, and
wherein the case is coupled to the molding portion by a screw inserted through the coupling hole and coupled to the coupling boss.

18. The mobile terminal of claim 1, wherein the window is curved along a lengthwise direction thereof,
wherein a printed circuit board is located at a rear surface of the separation-preventing member, the printed circuit board having a curved shape to correspond to the curved rear surface of the window,
wherein first and second guide rails are provided at both sides of the printed circuit board in a widthwise direction of the printed circuit board, and
wherein the first and second guide rails have a curved shape to correspond to the curved shape of the printed circuit board.

19. The mobile terminal of claim 18, further comprising a reinforcing member coupled to each of the first and second guide rails to reinforce rigidities of the first and second guide rails.

20. The mobile terminal of claim 18, further comprising a case having a curvature different from a curvature of the printed circuit board, the case having a boss in which a coupling member is inserted to couple the printed circuit board to the case,
wherein each of the first and second guide rails comprises an elastic member having a coupling hole through which the coupling member is inserted, the coupling hole being elastically deformable upon insertion of the coupling member.

* * * * *